United States Patent [19]

Kasper et al.

[11] 4,176,170

[45] Nov. 27, 1979

[54] TERNARY IONIC CONDUCTORS

[75] Inventors: Horst M. Kasper, Warren; Benjamin Tell, Matawan; Sigurd Wagner, Holmdel, all of N.J.

[73] Assignee: Bell Telephone Laboratories, Incorporated, Murray Hill, N.J.

[21] Appl. No.: 924,188

[22] Filed: Jul. 13, 1978

Related U.S. Application Data

[62] Division of Ser. No. 783,649, Apr. 1, 1977, Pat. No. 4,115,633.

[51] Int. Cl.² .................. H01M 6/18; C01B 19/00
[52] U.S. Cl. .................. 423/508; 429/191; 252/518
[58] Field of Search ............ 429/191, 218, 219, 193; 423/508, 511; 252/518

[56] References Cited

U.S. PATENT DOCUMENTS 3,347,639  10/1967  O'Kane .................. 423/508

FOREIGN PATENT DOCUMENTS 2409657  8/1974  Fed. Rep. of Germany .......... 429/191

*Primary Examiner*—Donald L. Walton
*Attorney, Agent, or Firm*—Bruce S. Schneider

[57] ABSTRACT

Ionic conductivity in ternary chalcogenides of the form $AB_xC_y$, where A is a metallic atom with atomic number no greater than 55 which has a +1 oxidation state, B is a group III A metallic atom and C is a group VI A atom, has been observed. This ionic conductivity makes the compounds useful as components in electrochemical cells, e.g., electrolytes and electrodes.

5 Claims, 4 Drawing Figures

TERNARY IONIC CONDUCTORS

This is a division, of application Ser. No. 783,649, now U.S. Pat. No. 4,115,633 filed Apr. 1, 1977.

BACKGROUND OF THE INVENTION

Electrochemical cells utilizing solid ionic conductors have many potential advantages. For example, alkali metals, such as sodium and lithium, are attractive for use as negative electrodes because of their electromotive potential. However, these metals react vigorously with water and therefore cannot be used in conventional cells. Use of a solid ionic conductor offers the possibility of employing alkali metal electrodes. Another example of the possible advantages afforded by solid ionic conductors involves electrode fabrication. Many materials utilized as reactants in an electrode are insulators and must be mixed with an electron conductor to form a composite electrode. Such electrodes, when functioning in a cell, produce two interfaces, a reactant-electron conductor interface and an electron conductor-electrolyte interface. The use of an ionic conductor, which also exhibits electronic conductivity, eliminates one interface.

Investigation for suitable ionic conductors has been intense. (A survey of ionic conductivity and a compilation of known ionic conductors can be found in Holzapfel and Rickert, "High Ionic Conductivity in Solids—Theoretical Aspects and Applications", Advances in Solid State Physics, XV (Pergamon-Viking 1975), compilation at page 322.) Recently, an investigation on the ionic conductivity of some II-VI compounds has been reported. (See R. Galli and F. Garbassi, Nature, 253, 702 (1975).) Because of their potential advantages, the search for new, solid ionic conductors is presently being actively pursued.

SUMMARY OF THE INVENTION

It has been found that solid compounds represented by the formula $AB_xC_y$ where A is a metallic atom (metallic atom here is used to mean an atom of an element which has metallic properties) with atomic number no greater than 55 which has a +1 oxidation state, B is a group III A metallic atom, C is a group VI A atom, and where x and y are such that $AB_xC_y$ is essentially electrically neutral. These compounds are crystalline solids. The symbol $AB_xC_y$ represents the average proportion of A to B to C found in a crystal. Thus, the subscripts need not and indeed usually are not exactly integral numbers. (However, in discussing the invention, integral numbers will be used as a pedagogic aid to represent the numerous compounds with x and y lying around the particular integer.)

Many compounds of the $ABC_2$ type have been disclosed as useful semiconductors. (See, for example, Applied Physics Letters, 28 (8) 454 (1976); Applied Physics Letters, 43 (5), 2469 (1972); Applied Physics Letters, 44, 4988 (1973).) Thus, these $ABC_2$ compounds have been used in applications utilizing only their electronic conductivity. However, it has now been found that compounds of the general type $AB_xC_y$ including $ABC_2$ compounds, and additionally including such compounds as $AB_5C_8$ exhibit ionic conductivity. As a result, these $AB_2C_y$ compounds are useful in the manufacture of electrochemical cells. Specifically, the disclosed compounds are useful as electrolytes or as electrodes. It is also possible to dope $AB_xC_y$ compounds. The doped compounds are similarly suitable for the manufacture of electrochemical cells.

DETAILED DESCRIPTION

Figure 1:
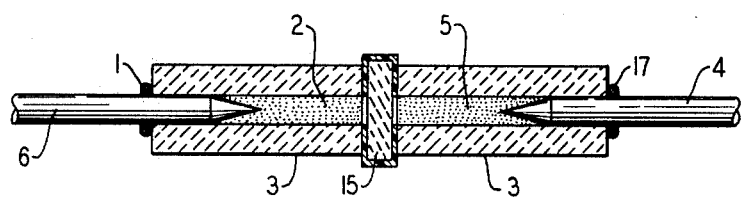
FIGS. 1 and 2 are representations of devices incorporating ionic conductors.

1. Choice of Compounds as Electrolytes or Electrodes

Electrodes and electrolytes must have different conductivity properties to successfully serve their respective purposes. In an electrochemical cell, electrolytes serve as a media for transport of an ionic species between electrodes. An ionically conducting electrolyte may also support transport of electrons between electrodes. The extent of electronic conduction which can be tolerated depends on the particular application. Electron conduction in the electrolyte causes a shunt circuit between the electrodes. The greater the electron conduction the greater the current passing internally between the electrodes. The particular use envisioned for the cell determines the allowable level of internal current. For different purposes, the electron conduction of the electrolyte can vary between an ionic transport number of 0.5 and 1. (An ionic transport number is a number between 0 and 1 equal to the fraction of charge carried through a compound by ionic species; by analogy an electronic transport number is the fraction of charge carried through a compound by electrons.) For example, the effectiveness of a cell for applications such as energy storage depends on the extent of electron conduction. The greater the electron conduction, the shorter the achievable storage time and the smaller the recoverable energy. Thus for storage purposes requiring long storage time or high energy recovery, an ionic transport number of 0.99 for the electrolyte is desirable. Less stringent requirements on storage time or energy recovery for a storage cell allow ionic transport numbers down to 0.9. When a cell is used for energy generation or for some other purpose which is not defeated by the flow of internal current, electrolytes with lower ionic transport numbers, e.g., as low as 0.5, are useful.

The use of the subject ternary chalcogenides as electrodes requires different transport properties than electrolytes. Electrodes made from the subject chalcogenides must act both as a conductor of electrons to the external circuit and as a reaction site for ionic species, i.e., as the cell is used ionic entities are either extracted from or added to the crystal structure of the electrode. Again the particular application determines the useful range of ionic conductivity for the electrode material. Generally, depending on the purpose, a material can have an ionic transport number between 0.1 and 0.9 and be operable as an electrode material. It should be noted that as the cell operates the stoichiometric composition of the electrode material changes. This eventually leads to a phase separation in the electrode material. Thus the time the electrode remains in a single phase is limited by the crystal properties. A stoichiometric range of $AB_x \pm x/4 C_y \pm y/4$ is therefore desirable for more demanding uses, e.g., storage batteries. Although a material with narrow stoichiometric limitations restricts the time the electrode remains in a single phase, such material is still useful.

The previous discussion defines how the subject compositions can be used in the electrochemical cells of the invention. Once an $AB_xC_y$ compound is synthesized, a cell is constructed with the compound as the electrolyte. The actual voltage produced is measured and compared to the theoretical voltage for the particular electrodes used. (Theoretical values are easily calculable from readily available free energy data.) The ratio of actual to theoretical voltage is equal to the ionic transport number. If the ionic transport number is at least 0.5, the manufacture of inventive electrochemical cells using the particular $AB_xC_y$ compound as an electrolyte is possible. If the ionic number is between 0.1 and 0.9, use in an electrode is possible.

It is possible to alter the conductivity properties of the $AB_xC_y$ compounds by addition of a dopant. Through the use of dopants, it is possible to convert a compound from a suitable electrode compound to a suitable electrolyte or conversely, from electrolyte to electrode.

2. Cell Construction

Investigations to date show that the A entity of $AB_xC_y$ compounds is the ionic species which carries the charge. Therefore, when the compound is used as an electrolyte in a cell, the cathode should be composed of elemental A or another composition which has an A entity as the charge carrier. For example, when Ag-GaSe$_2$ is used as an electrolyte, a suitable cathode is elemental silver or even an $AgB_xC_y$ compound with the appropriate ionic and electronic conductivity. The form of the electrode is not critical, e.g., the active substance is pressed into a pellet or if metallic, rolled into a sheet. If very reactive compounds, e.g., lithium or sodium, are used, water and air must be excluded during fabrication and after completion of the cell. Conventional methods for preparation of the electrode and construction of the cell in a dry nitrogen atmosphere are useful for fabrication involving reactive entities. The cell shown in FIG. 1 illustrates a configuration suitable for highly reactive metals. A sealant 1 around a graphite rod 6 seals the active metal 2 into the cell casing 3 and against the electrolyte 15. The casing should be a substance which does not react with any of the cell components, e.g., glass tubing.

The composition of the anode does not depend on the electrolyte used. Typical examples are elemental chalcogens, $AB_xC_y$, or iodine. However, the difference in chemical potential between the cathode material and anode material determines the voltage of the cell. Therefore, it is advantageous to choose an anode with a large positive electromotive value. The choice of anode is not critical. Elemental chalcogens and many other suitable anodes are insulators. Therefore, these insulators must be mixed with a conductor, e.g., graphite, to form a composite electrode. It is desirable to obtain the best electrical contact between the graphite and insulator. A suitable method is to compress the mixture into a pellet. Electrical contact to the anode is made by a conventional method, e.g., as shown in FIG. 1, a graphite rod 4 surrounded by sealant 17 contacts a pellet 5.

The $AB_xC_y$ electrolytes are useful in a single crystal form or a polycrystalline form such as a pellet pressed from a powder. Since the subject electrolytes are solids, the thickness of the electrolyte layer used is not critical and thicknesses on the order of 0.1 mm are acceptable.

The electrolyte should make good electrical contact to both the anodes and cathodes of the cell. This is usually accomplished by insuring intimate mechanical contact between the electrodes and the electrolyte.

Figure 2:
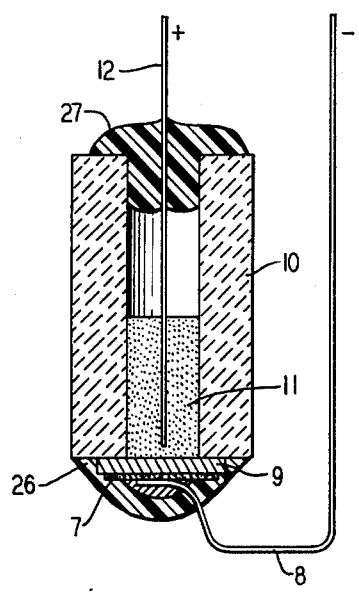

A design appropriate for metal cathodes is shown in FIG. 2. Various methods of construction are possible. Typically the electrolyte is cleaned to ensure good electrical contact. Single crystals are cleaned by methods such as etching with a 0.5 percent by volume bromine solution in methanol followed by cleaning in a methanol ultrasonic bath or by etching for approximately 10 seconds in a 1:1:1 solution of HCl, HNO$_3$, and water. Polycrystalline pellets should be dipped in an appropriate solvent to remove grease and oil. The electrolyte 9 is then contacted with the cathode 7. This is accomplished by evaporating (by well known techniques) an appropriate metal onto the electrode or by any other method which yields good electrical contact. A lead wire 8 is attached to the cathode by conventional means, e.g., silver paint. This assembly, consisting of electrolyte 9, cathode 7, and lead wire 8, is attached to the bottom of a glass tube 10, or other inert casing capable of withstanding elevated temperatures, with a sealant 26 such as a silicone resin with TiO$_2$ filler (e.g., GE #2561-710P), a two component epoxy resin (e.g., Hysol FC White), or an air drying cement (Sauereisen #1). The tube is filled with an anode composition 11, e.g., graphite-sulfur composite and a lead wire 12 is inserted. The tube is then capped with a sealant 27.

A design suitable for active metal or composite electrodes is shown in FIG. 1. This structure has been described earlier. The sealant used is the same as that employed in the device of FIG. 2. It should be noted that the above-described cells are merely illustrative of the many designs for electrochemical devices incorporating the $AB_xC_y$ compounds. Designs with more than one cathode, anode or electrolyte are possible. It should further be realized that the use of an $AB_xC_y$ electrolyte alone or cathode alone or an anode alone does not dictate the use of other $AB_xC_y$ compounds as components in the electrochemical cell. The restriction upon the use of the compounds in cell components is principally imposed by the necessary conductivity associated with the specific component.

The following examples are included to demonstrate a means for synthesizing various $AB_xC_y$ compounds and further to show the range of ionic transport numbers obtainable.

EXAMPLE 1

Figure 3:
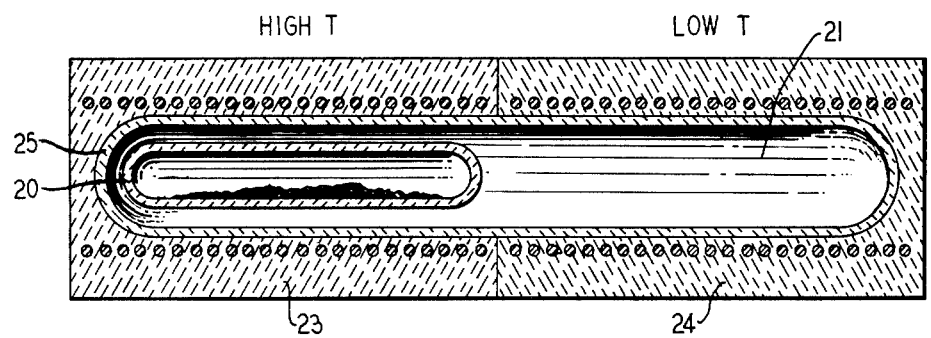
FIG. 3 is a schematic representation of an apparatus useful for synthesizing ionic conductors.

A quartz tube 24 mm. OD and 12" long (20 FIG. 3) was sealed on one end and filled with 6.84 grams of 99.999 percent pure copper, 37.50 grams of 99.999 percent pure gallium and 71.0 grams of 99.999 percent pure sulfur. The quartz tube 20 was then inserted into a 30" long, 28 mm. ID fused quartz tube 21 which had been sealed on one end. The outer tube was evacuated with a mechanical pump, backfilled with 150 Torr of helium gas, and the remaining opening sealed. The tube was placed in a furnace with two separately heated 18 in. sections, 23 and 24. The inner tube 20 was positioned at one end 25 of the sealed outer tube 21. This side of the outer tube was kept in furnace section 23. This furnace section was slowly heated (over a 3 to 5 hour period) to a T$_{max}$ of 1130 degrees C. (Rapid heating may result in an explosion.) Furnace section 24 was raised to between 600 and 700 degrees C. T$_{max}$ was maintained for 4 to 24 hours and then abruptly lowered by 50 to 70 degrees C.

to induce crystallization. The furnace was then slowly cooled (5 to 40 degrees C. per day) for growth of large crystals. (If polycrystalline material is desired less care is necessary in cooling). The growth was terminated after 3 to 14 days by slowly removing the quartz tube from the furnace. Crystals represented by the formula $CuGa_5S_8$ were obtained.

The same procedure was followed for the starting materials and $T_{max}$'s indicated in Table 1. However, for production of selenides, the outer tube was only 18 in. long and the inner tube was evacuated and sealed before insertion into the outer tube. The outer tube was again evacuated but not backfilled with helium. The low temperature furnace was kept between 700 degrees C. and 800 degrees C. For the lithium compounds or for other very reactive metals, the reactants were inserted into a vitreous carbon liner. This liner, in turn, was put in the inner quartz tube 20 which was evacuated and sealed.

Table I

| Compound | Wt. (grams) A | Wt. (grams) B | Wt. (grams) C | $T_{max}$ degrees C. |
|---|---|---|---|---|
| $CuGaS_2$ | 22.78 | 25.00 | 25.0 | 1150 |
| $AgGaS_2$ | 38.68 | 25.00 | 25.0 | 1150 |
| $AgGaSe_2$ | 38.68 | 25.00 | 59.0 | 1030 |
| $AgInSe_2$ | 28.18 | 30.00 | 41.3 | 1000 |
| $LiInS_2$ | 1.81 | 30.00 | 16.8 | 1100 |
| $CuGa_5S_8$ | 6.84 | 37.50 | 29.5 | 1130 |
| $CuGa_5Se_8$ | 6.84 | 37.50 | 71.0 | 1170 |
| $AgGa_5S_8$ | 11.60 | 37.50 | 29.5 | 1180 |
| $AgIn_5Se_8$ | 5.63 | 30.00 | 33.0 | 1140 |

EXAMPLE II

Lithium doped $AgGaS_2$ samples were produced by adding 0.05 grams of Li to the appropriate charge indicated in Table I and proceeding by the preparatory procedure outlined in Example I for reactive metals.

EXAMPLE III

The ionic transport number of $AgGa_5S_8$ was measured by making a cell like that of FIG. 2 using $AgGa_5S_8$ as the electrolyte, Ag as the cathode and sulfur-carbon composite (20 to 40 percent carbon by weight) as the anode. The cell was heated to 270 degrees C. and an open circuit voltage, E(V) of 0.25 was measured. The theoretical voltage of this cell at 270 degrees C. is 0.24. Therefore, within experimental error, the ionic transport number, $t_i$, is approximately 1. The internal resistance of the cell was measured as approximately $1 \times 10^6 \Omega$. Operation at higher temperatures decreases the internal resistance thus raising the usable power delivered by the cell.

The compounds of Table I were similarly tested to determine ionic transport numbers. Table II shows the results for the indicated cell used. For $LiInS_2$ the cell configuration of FIG. 1 was used.

Table II

| Cell | | E(V) | $E_o$(V) | $t_i$ | $R(10^6\Omega)$ | T(degrees C.) of Cell During Operation |
|---|---|---|---|---|---|---|
| $Cu/CuGaS_2/S,C$ | | 0.03 | 0.47 | 0.06 | 0.5 | 250 |
| $Ag/AgGaS_2/S,C$ | #1: | 0.26 | 0.24 | 1.0 | 3 | 270 |
| | #2: | 0.16 | 0.21 | 0.76 | 100 | 20 |
| | #3: | 0.28 | 0.23 | 1.0 | 25 | 200 |
| $Ag/AgGaSe_2/Se,C$ | #1: | 0.22 | 0.25 | 0.68 | 200 | 20 |
| | #2: | 0.13 | 0.25 | 0.52 | 100 | 20 |
| $Li/LiInS_2/S,C$ | | 2.2 | 2.45 | 0.94 | 100 | 200 |
| $Ag/AgInSe_2/I,C$ | | 0.25 | 0.62 | 0.40 | 0.1 | 100 |
| $Cu/CuGa_5S_8/S,C$ | | 0.34 | 0.47 | 0.72 | 18 | 220 |
| $Cu/CuGa_5Se_8/Se,C$ | #1: | 0.18 | 0.35 | 0.51 | 2.5 | 230 |
| | #2: | 0.11 | 0.34 | 0.32 | 70 | 20 |
| $Ag/AgGa_5S_8/S,C$ | #1: | 0.26 | 0.24 | 1.0 | 1 | 270 |
| | #2: | 0.20 | 0.23 | 0.87 | 85 | 100 |
| | #3: | 0.20 | 0.23 | 0.87 | 100 | 60 |
| $Ag/AgIn_5Se_8/I,C$ | | 0.15 | 0.62 | 0.24 | 0.02 | 150 |

More than one set of data is given for each cell since such data varies with the exact stoichiometry of the electrolyte used.

The lifetimes of the iodine cells were variable and shortened. This phenomenon was probably due to leakage of iodine through the sealant.

Figure 4:
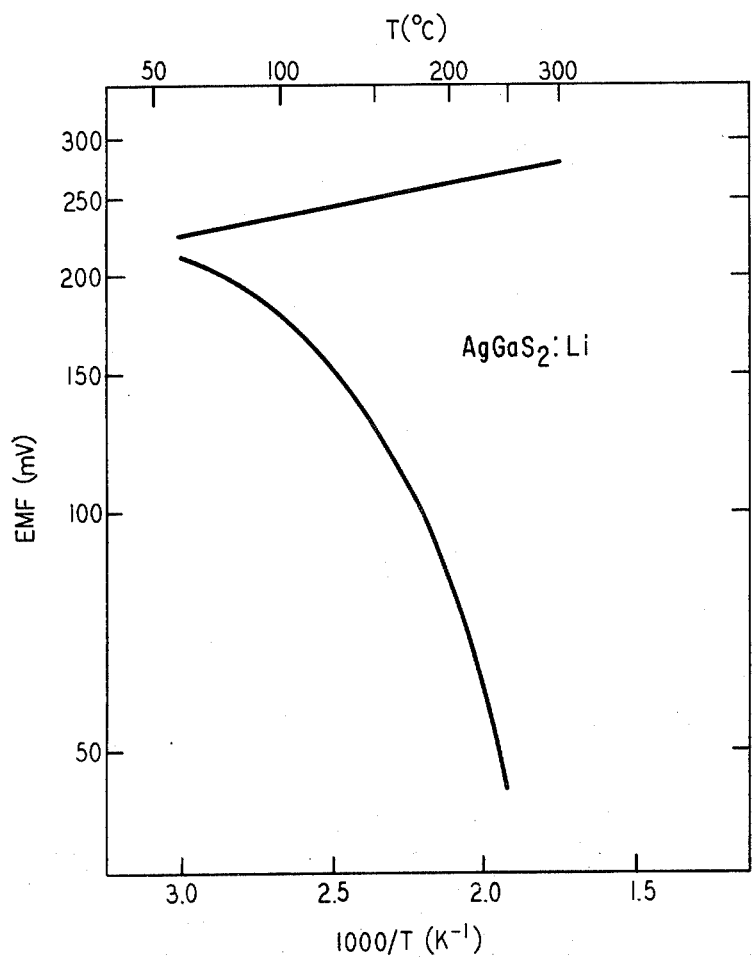
FIG. 4 is a representation of electronic properties of specific ionic conductors.

FIG. 4 is a graph of open circuit voltage versus $T^{-1}$ for samples with slightly different stoichiometries prepared as in Example II. It can be seen that it is possible for the dopant to have a strong effect on the ratio of ionic to electronic conductivity as a function of temperature. It further appears as shown in FIG. 4 that the stoichiometric composition of the compound before doping has a strong effect on the ultimate electrical properties of the doped compound.

What is claimed is:

1. The composition represented by the formula $AB_5C_8$ wherein A is a metallic atom with atomic number no greater than 55 which has a +1 oxidation state, B is a group III A metallic atom, and C is a group VI A atom.

2. The composition of claim 1 wherein A is selected from the group consisting essentially of copper and silver.

3. The composition of claim 1 wherein B is selected from the group consisting essentially of gallium and indium.

4. The composition of claim 1 wherein C is selected from the group consisting essentially of sulfur and selenium.

5. The composition of claim 1 including a dopant.

* * * * *